United States Patent [19]

Mimura et al.

[11] Patent Number: 5,289,408
[45] Date of Patent: Feb. 22, 1994

[54] MEMORY APPARATUS USING TUNNEL CURRENT TECHNIQUES

[75] Inventors: Yoshiyuki Mimura; Hiroshi Kajimura; Toshihito Kouchi; Akitoshi Toda; Yasuo Isono; Hiroko Ohta, all of Tokyo; Ryouhei Shimizu, Saitama, all of Japan

[73] Assignee: Olympus Optical Co., Ltd., Tokyo, Japan

[21] Appl. No.: 873,635

[22] Filed: Apr. 23, 1992

Related U.S. Application Data

[63] Continuation of Ser. No. 473,303, Feb. 1, 1990, abandoned.

[30] Foreign Application Priority Data

Feb. 9, 1989 [JP] Japan .................................. 1-30339
Mar. 20, 1989 [JP] Japan .................................. 1-68555

[51] Int. Cl.$^5$ ...................... G11C 13/00; G01N 27/00
[52] U.S. Cl. .................................. 365/151; 365/174; 365/233; 365/230.03; 365/183; 369/126; 250/306; 250/309; 257/30
[58] Field of Search ............... 365/151, 174, 189.01, 365/233, 183, 238, 230.03; 369/126, 144; 250/276, 306, 307, 309; 357/6, 8; 257/30

[56] References Cited

U.S. PATENT DOCUMENTS

| | | | |
|---|---|---|---|
| 4,343,993 | 8/1982 | Binnig et al. | 250/306 |
| 4,831,614 | 5/1989 | Duerig et al. | 365/174 |
| 4,916,688 | 4/1990 | Foster et al. | 369/126 |
| 4,945,515 | 7/1990 | Ooumi | 365/174 |
| 4,956,817 | 9/1990 | West et al. | 365/89.01 |
| 4,962,480 | 10/1990 | Ooumi et al. | 365/151 |
| 5,036,490 | 7/1991 | Kajimura et al. | 365/151 |

FOREIGN PATENT DOCUMENTS 0272935 6/1988 European Pat. Off.
275881 7/1988 European Pat. Off.

OTHER PUBLICATIONS

Akamine, Albrecht, Zdeblick, and Quate, "Microfabricated Scanning Tunneling Microscope", IEEE Electron Devices Letters, vol. 10, No. 11, Nov. 1989, pp. 490–492.

*Primary Examiner*—Glenn Gossage
*Attorney, Agent, or Firm*—Frishauf, Holtz, Goodman & Woodward

[57] ABSTRACT

A scanning tunneling microscope memory apparatus comprises first and second integrated circuit (IC) substrates. First and second cantilevers, which can be moved by piezoelectric elements, are arranged on the first and second IC substrates, respectively. Tunnel current probes are provided on a free end of the first cantilever, and a recording element is provided on a free end of the second cantilever. The first and second cantilevers are spaced from each other and overlap such that the tunnel current probes face the recording element. The first or second substrate includes a charge coupled device (CCD) circuit, a control circuit for controlling the CCD circuit and cantilevers, and a drive circuit having a preamplifier, a write circuit, and a servo circuit.

21 Claims, 6 Drawing Sheets

MEMORY APPARATUS USING TUNNEL CURRENT TECHNIQUES

This application is a Continuation of application Ser. No. 07/473,303, filed Feb. 1, 1990, now abandoned.

BACKGROUND OF THE INVENTION

1. Field of the Invention

The present invention relates to a memory apparatus using tunnel current techniques, which may be termed a scanning tunneling microscope (STM) memory apparatus, comprising a memory device, which includes tunnel current probes and a recording element, and a signal processing circuit for writing/reading data in/from the recording element.

2. Description of the Related Art

A probe with a pointed tip portion is brought toward an electrically conductive substrate at a distance of several nm, and a voltage is applied across the probe and the substrate, so that a tunnel current flows therebetween by virtue of tunnel effect. The value of the tunnel current varies dramatically in accordance with the change in distance between the probe and the substrate.

An STM utilizes the characteristic of the tunnel current, and allows atomic-level observation of the surface configuration of a substrate. In the STM, a probe is caused to scan over the surface of the substrate, and the distance between the probe and the substrate is controlled. Thus, a three-dimensional image, representative of the surface configuration of the substrate is obtained. For example, while the distance between the probe and the substrate is controlled so as to keep the tunnel current constant, the probe is caused to scan over the surface of the substrate. Based on the positional data of the probe obtained during the scan, an STM image is obtained. The tunnel current flowing between the probe and the substrate mainly depends on the work functions of materials of the probe and the substrate. Thus, the tunnel current produced while the probe is caused to scan is changed by the data recorded on the substrate in the form of projections and recesses, the kind of atoms of the substrate, or the charge trapped on the surface of the substrate.

It has been proposed to describe a pattern directly on a silicon substrate with use of the STM. For example, Journal of Vacuum Science & Technology, McCord, "Lithography with the Scanning Tunneling Microscope", B Vol. 4, No. 1, pp. 86–88, Jan./Feb. 1986 (M. A. McCord, et al.) reports that tracks were formed on a metal deposition film on a silicon substrate after the film was STM-scanned with energy of 10 eV. Also this document reports that lines were written on a 10 nm docoscenoic aicd Langmuir-Blodgett (LB) film by means of a beam of 25 V and 12 nA.

Furthermore, an article by Akamine, Albrecht, Zdeblick and Quate, "MICROFABRICATED SCANNING TUNNELING MICROSCOPE" (IEEE Electron Device Letters, Vol. 10, No. 11, pages 490–492, November 1989) reported on a micro STM wherein an end portion of a cantilever is provided with a probe having a pointed tip portion. This cantilever is driven by two piezoelectric elements which are formed of zinc oxide (ZnO). The cantilever is formed by an integrated circuit (IC) process so as to have the size of 20 $\mu$m × 200 $\mu$m × 5 $\mu$m. Also, the probe is formed by an IC process in which deposition is performed by using a mask with a hole of about 3 $\mu$m diameter.

SUMMARY OF THE INVENTION

The object of the present invention is to provide a memory apparatus using tunnel current techniques suitable for signal processing for writing/reading data in/from an STM memory.

A memory apparatus according to the present invention comprises tunnel current probes; a recording element arranged to face the tunnel current probes, and including recording blocks; movement means for moving the tunnel current probes and the recording element relative to each other; write means for writing data on the recording element, with use of the tunnel current probes; read means for reading out the data recorded on the recording element with use of the tunnel current probes; input/output arithmetic means connected to the write means and the read means and operated by clocks; and control means for controlling the movement means, the write means, the read means, and the input/output arithmetic means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

In the basic operation of an STM (scanning tunneling microscope), a tunnel current probe is caused to scan over a facing surface in accordance with a predetermined cycle. Thus, in an STM, it is desirable that data is written/read out in/from, block by block, each scanned region. In this case, the data may be digital or analog.

An embodiment of the present invention will now be described with reference to the accompanying drawings.

Figure 1:
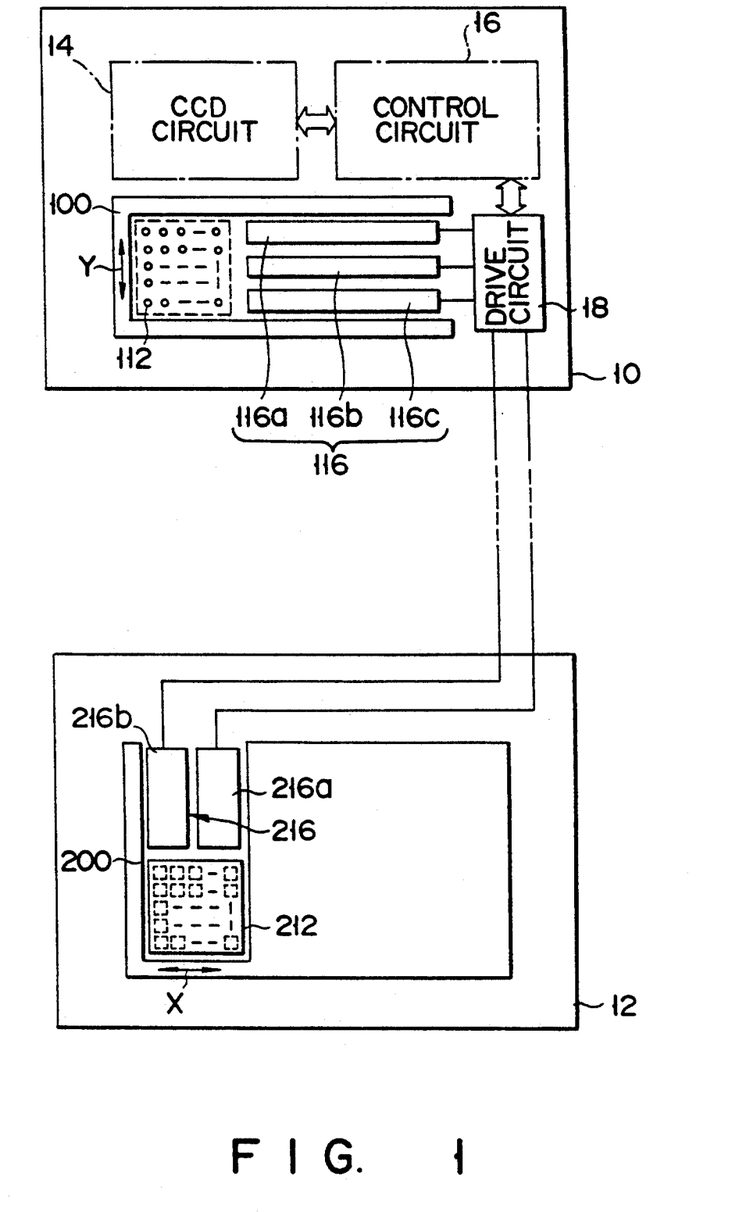
FIG. 1 schematically shows a memory apparatus using tunnel current techniques according to the present invention.
Figure 2:
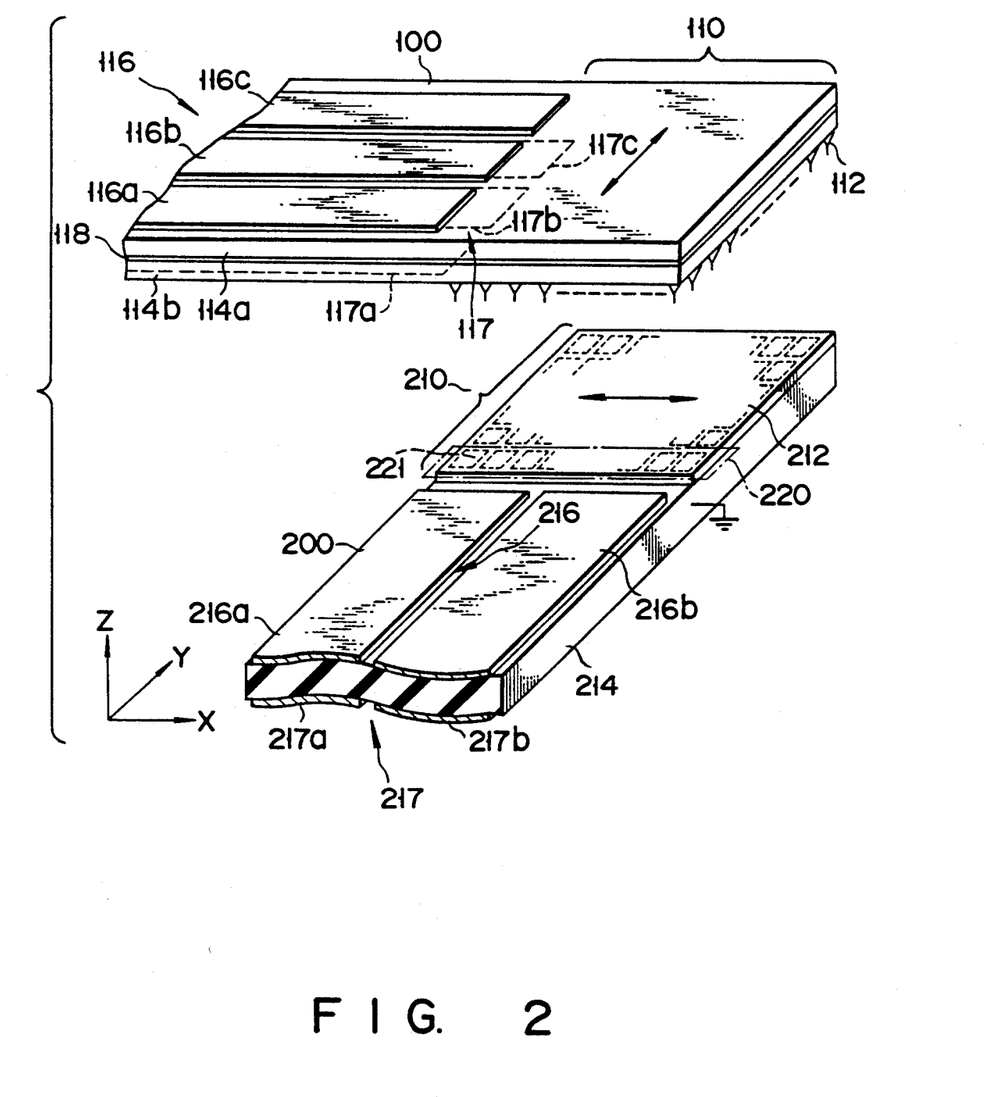
FIG. 2 is a perspective view showing structures of first and second cantilevers.

As shown in FIG. 1, memory apparatus using tunnel current techniques comprises first and second IC substrates 10 and 12. The substrates 10 and 12 have first and second cantilevers 100 and 200 which are allowed to perform a scanning operation by means of piezoelectric elements. The first substrate 10 includes a CCD circuit 14, a control circuit 16 for controlling the cantilever, CCD circuit, etc., and a drive circuit 18 having a pre-amplifier, a write circuit, a servo circuit, etc. The first and second substrates 10 and 12 overlap each other at a given distance, such that the first and second cantilevers 100 and 200 cross each other at right angles. Accordingly, as shown in FIG. 2, free end portions 110 and 210 of the first and second cantilevers 100 and 200, respectively face each other at a predetermined distance.

The first cantilever 100 includes a pair of piezoelectric elements 114a and 114b formed of, e.g. ZnO, a center aluminum electrode layer 118 interposed between piezoelectric elements 114a and 114b, and upper and lower aluminum electrode layers 116 and 117 formed on the upper and lower sides of the piezoelectric elements 114a and 114b. The upper electrode layer 116 has three electrode patterns 116a, 116b and 116c extending in the longitudinal direction of the cantilever 100, and also the lower electrode layer 117 has three electrode patterns 117a, 117b and 117c extending in the longitudinal direction of the cantilever 100. Upon application of a predetermined voltage to the electrodes 116 to 118, the free end portion of cantilever 100 is moved in Z- and Y-directions (in FIG. 2). In other words, when voltages, which have opposite phases with respect to the center common electrode 118, are applied to the electrode patterns 116b and 117b, one of the piezoelectric elements (e.g. 114a) extends and the other (e.g. 114b) contracts. As a result, the cantilever 100 is bent and the free end portion 110 of cantilever 100 is moved in the Z-direction. When opposite-phase voltages are applied to the facing electrode patterns 116a and 117a and to the facing electrode patterns 116c and 117c, the free end portion 110 is moved in the Y-direction.

On the other hand, the second cantilever 200 has upper and lower aluminum electrodes 216 and 217 that sandwich a piezoelectric element 214 formed of, e.g. ZnO. The upper electrode 216 has two electrode patterns 216a and 216b separately extending in the longitudinal direction of cantilever 200, and also the lower electrode 217 has two electrode patterns 217a and 217b separately extending in the longitudinal direction of cantilever 200. When opposite-phase voltages are applied to the facing electrode patterns 216a and 217a and to the facing electrode patterns 216b and 217b, a free end portion 210 of the second cantilever 200 is moved in the X-direction.

A plurality of tunnel current probes 112 are provided on the free end portion 110 of first cantilever 100. The tunnel current probes 112 are spaced apart from one another, for example, by a distance equal to a scan amplitude of cantilever 100. On the other hand, a recording element 212 is provided on the free end portion 210 of second cantilever 200. Thus, the tunnel current probes 112 and the recording element 212 face each other at a given distance. The first and second cantilevers 100 and 200 are moved independently in the Y- and X-directions, whereby the probes 112 can scan the surface of recording element 212. For example, data is written in a lattice manner on a portion of the surface of recording element 212, which is selected as a charge or magnetic domain.

Figure 3:
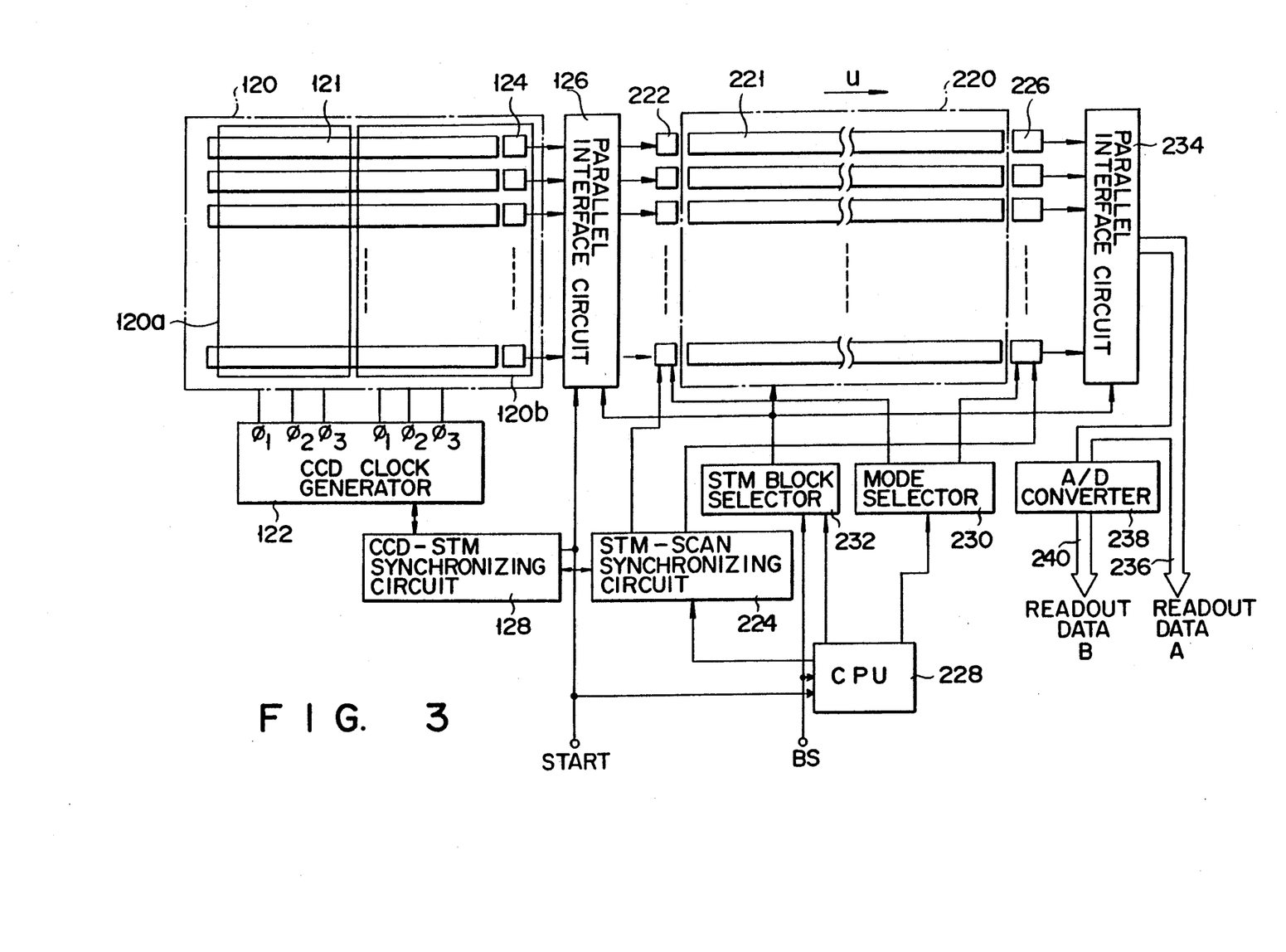
FIG. 3 is a block diagram showing a charge coupled device (CCD) circuit, a control circuit and an FIFO (First-in First-out)

Referring to FIG. 3, a CCD block 120 corresponding to CCD circuit 14 of FIG. 1 includes an n-number of surface channel type CCD arrays 121, etc. Each array 121 of CCD block 120 is controlled by, e.g. a three-phase CCD clock generator 122. Data is output from the CCD arrays 121 to corresponding CCD output diodes 124 in a parallel manner. The CCD block 120 has a light-receiving section 120a in an area corresponding to the front part of the arrays 121, and has a transfer section 120b in an area corresponding to the rear part of the arrays 121. Memory block 220 corresponds to an n-number of memory regions 221 on the recording element 212 (see FIG. 2). Each memory region 221 has a memory capacity of 10,000 (points) digits in a two-dimensional (x, y) serial recording area, when a scan stroke is set to 100 manometers (nm) and an interval of record positions is set to 1 nm. Data write circuits 222 are controlled by write control pulses output from an STM scan synchronizing circuit 224, so that respective tunnel current probes 112 corresponding to the memory regions 221 are operated and data is written in predetermined locations. Read amplifiers 226 connected to the corresponding tunnel current probes 112 are controlled by read control pulses output from the STM-scan synchronizing circuit 224, so that the tunnel current probes 112 associated with the memory regions 221 are operated and data is read from predetermined locations. The data read/write operation is controlled by a mode selector 230, which receives a mode signal from a system controller or CPU 228 and an STM block selector 232 which receives a block select signal from the central processing unit (CPU) 228.

The parallel interface circuit 126 permits n-number of CCD output diodes 124 included in the CCD block 120 to be connected to the STM memory block 220 having n-number of memory regions 221. The circuit 126 is controlled by a CCD-synchronizing circuit 128 via a CCD clock generator 122, or by a CPU 228 via an STM-scan synchronizing control circuit 224. As a result, the parallel interface circuit 126 supplies its output signals to the data write circuit 222 corresponding to each pair of data transmitted at a predetermined timing via a CCD output diode 124. For example, the relationship between the transfer speed (c) of the CCD and the write speed (ft) of the STM is set to be ft=n·fc (n=an integer). In the case where the transfer capacity of each CCD array 121 is 1,000 (pixels) digits, when fc=100 kilohertz (KHz) and n=10, data is written by clocks of ft=1 megahertz (MHz) during the scan of the STM. When data of the CCD block 120 corresponding to one line of a picture screen are transferred as serial data from the CCD array 121 to the corresponding memory regions 221, the data is written with an interleave of 1:10 on the memory region 221. Thus, each memory 221 has an unused area corresponding to 9 lines (=10−1), and one STM memory block has an unused memory area corresponding to 9 frames. Accordingly, images of 10 frames are recorded in the STM memory block 220 by performing 10 parallel transfer operations. In the case where the CCD output is analog and analog data is written in the STM memory block such that one data unit corresponds to one memory region, the data can be written in the STM memory in the interleave manner, as described above. On the other hand, when the CCD output is analog/digital (A/D) converted, an A/D converter is combined with the interface circuit 126. In this case, for example, 10-bit digital data can be stored in the STM memory with high density, with use of the above transfer rate.

A parallel interface circuit (PIF) 234 supplies data from the read amplifiers 226 to a bus 236. On the other hand, when analog data is stored in the STM memory, the interface (PIF) 234 supplies the data to a digital bus 240 through an A/D converter 238.

When data is analog, the parallel interface circuits 126, 130 and 234 are constituted by, for example, metal oxide semiconductor (MOS) type switched-capacity circuits (SC circuits) capable of processing analog signals. Such circuits are described in "2-Phase Circulating Shift Register For Switched-Capacitor N-Path Filters", Electronics Letter, May 27, 1982, Vol. 18, No. 11, Page 444. The parallel interface circuits 126 and 234 and the STM memory block 220 are controlled by an STM block selector 232 connected to the CPU 228.

Figure 5:
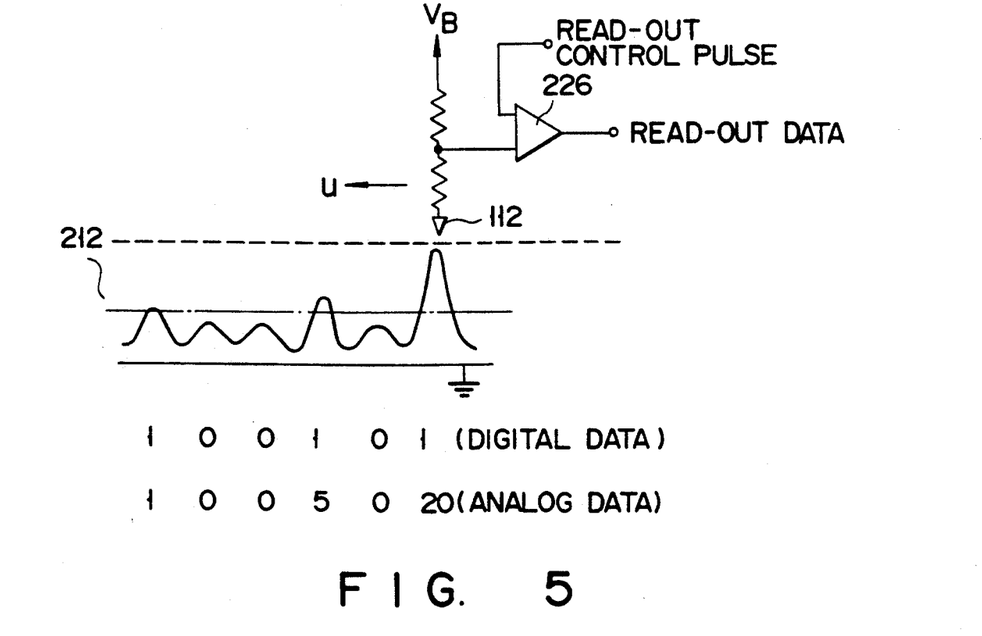
FIG. 5 is a view for explaining a data read-out operation.

The read-out operation will now be described with reference to FIG. 5. The drive circuit 18 applies opposite-phase alternating current (AC) voltages across the facing electrode patterns 116a and 117a and across the facing electrode patterns 116c and 117c of the first cantilever 100. Similarly, the drive circuit 18 applies opposite-phase AC voltages across the facing electrode patterns 216a and 217a and across the facing electrode patterns 216b and 217b of the second cantilever 200. Consequently, the free end portion 110 of first cantilever 100 oscillates in the X-direction, and the free end portion 210 of second cantilever 200 oscillates in the Y-direction. In this case, the cycle of oscillation of each free end portion is determined and synchronized by the drive circuit 18, whereby the tunnel current probes 112 provided on the free end portion 110 of first cantilever 100 are caused to scan over the surface of the recording element 212 provided on the free end portion 210 of second cantilever 200.

Voltages, which have opposite phases with respect to center electrode 118, are applied across the facing electrode patterns 116b and 117b of first cantilever 100, so that first cantilever 100 moves in the vertical direction or Z-direction. The voltages applied to the electrode patterns 116b and 117b are controlled by the drive circuit 18 on the basis of a tunnel current flowing through one of the tunnel current probes 112, for example, a center probe. Thus, for example, a predetermined distance can be kept between the tunnel current probe 112 and the recording element 212.

The mode selector 230 is controlled by a mode signal output from the CPU 228, and a read control pulse is supplied from the STM-scan synchronizing circuit 224 to the read amplifiers 226 selected by the STM block selector 232. Consequently, while the tunnel current probes 112 are moved in the direction of symbol u, data in each memory region 221 of the selected STM memory block 220 is read out by the corresponding probe.

During the scan operating, the tunnel currents flowing between the selected STM memory block 220 and the corresponding tunnel current probes 112 are detected by the read amplifiers 226. In accordance with the magnitude and variation of the detected tunnel currents, analog data, e.g. "20, 0, 5, 0, 0, 1 . . . ", is output to the bus 236. If necessary, digital data, e.g. "(10010), (00000), (00101), (00000), (00000), (00001)", is supplied to the digital bus 240 through the A/D converter 238. In the case of digital data, data "(10010), (00000), (00101), (00000), (00000), (00001)" is output directly to the digital bus 240.

Figure 6:
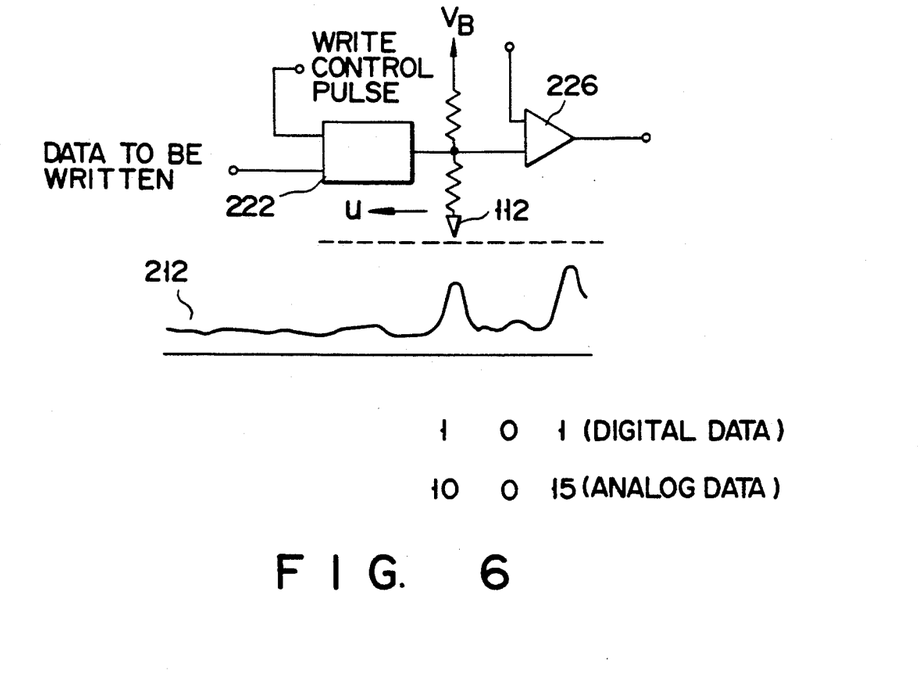
FIG. 6 is a view for explaining a data write operation.

Next, the write operation will now be described with reference to FIG. 6. In the write operation, the tunnel current probes 112 are caused to scan over the recording element 212 in the same manner as in the readout operation. In this state, the mode selector 230 is controlled by the mode signal output from the CPU 228, and a write control pulse is supplied from the STM-scan synchronizing circuit 224 to the data write circuit 222 connected to the STM memory block selected by the STM block 220 selector 232. In other words, the data transferred to the parallel interface circuit 126 through the CCD output diodes 124 is supplied to the data write circuits 222 at the timing set by the CCD-STM synchronizing circuit 128. As a result, the data is written in the selected STM memory block 222 in digital form (e.g. "1, 0, 1 . . . ") or in analog form (15, 0, 10 . . . ").

The recording of analog data is effected, for example, by controlling the voltage applied across the tunnel current probes 112 and the recording medium 212 in accordance with the data to be recorded. More specifically, the data write circuit 222 comprises a variable voltage power source for applying a voltage across the tunnel current probes 112 and the recording element 212. Thus, a voltage corresponding to the data to be recorded is applied across the probes 112 and the recording element 212. As a result, the charge, the amount of which corresponds to the data to be recorded, is trapped on the recording element 212. In accordance with the amount of trapped charge, the energy state of free electrons on the surface of recording element 212 is determined, and this energy state is observed at the time of data read-out. Accordingly, one analog data unit is recorded in one recording region.

The recording of analog data is also effected by changing a time period in which the voltage is applied across the tunnel current probes 112 and the recording element 212. More specifically, the data write circuit 222 comprises means for determining the voltage application period in accordance with the data to be recorded, and means for applying the voltage across the probes 112 and the recording element 212 only during the determined period. The charge, the amount of which corresponds to the data to be recorded, is trapped on the recording element 212, and analog data is recorded.

Further, the recording of analog data is effected by changing the distance between the tunnel current probes 112 and the recording element 212 while the potentials of the probes 112 and the recording element 212 are being kept at constant values. In this case, the data write circuit 222 comprises means for determining the voltage applied to the electrode patterns 116b and 117b in accordance with the data to be recorded. The amount of charge to be trapped is varied by the change in distance between the probes 112 and the recording element 212. Thus, analog data is written.

Figure 7:
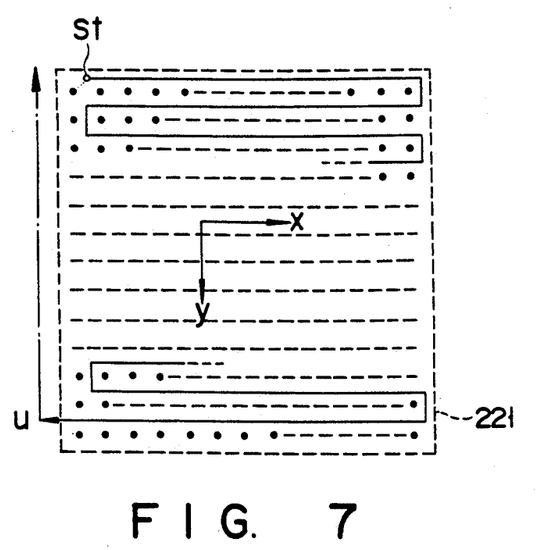
FIG. 7 shows an example of data recorded by causing one tunnel current probe to scan over a corresponding memory region.

When the tunnel current probe 112 scans the associated memory region of the STM memory block 220, the probe 112 moves in a direction of symbol u (in FIG. 7), while writing data from the write (or read) start point St. If the write (read) start point St and a write (read) end point are located on the same side, the time in which the probe 112 returns from the end point to the start point St can be shortened.

Figure 8A:
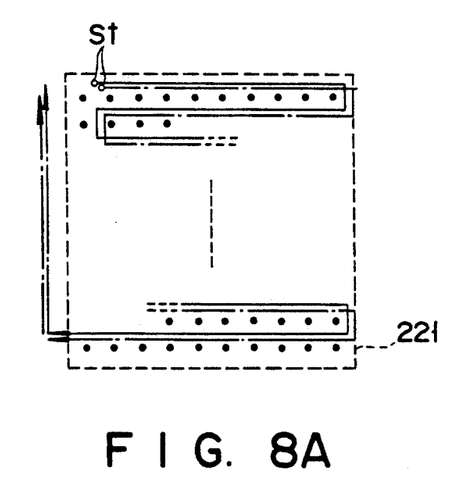
FIGS. 8A and 8B illustrate the movement of the probe at the time of writing and reading data.
Figure 8B:
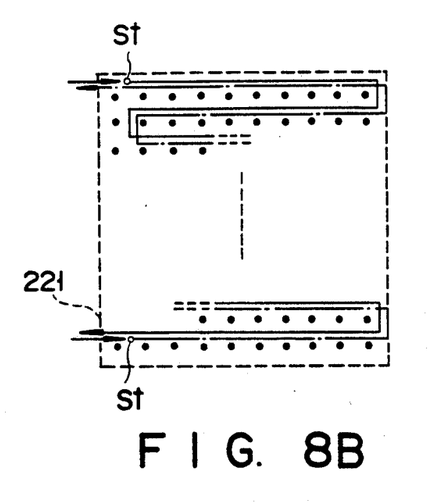

FIGS. 8A and 8B illustrate the movement of the probe in the write/read mode. Arrows of solid lines indicate the movement of the probe in the write mode, and arrows of dot-and-dash lines indicate the movement of the probe in the read-out mode. One of a FIFO (first in - First out)(FIG. 8A) recording method or a LIFO (Last in - First out)(FIG. 8B) recording method is selected by the STM-scan synchronizing circuit 224. Of course, the probe can be returned to the start point St before it reaches the end point.

Figure 4:
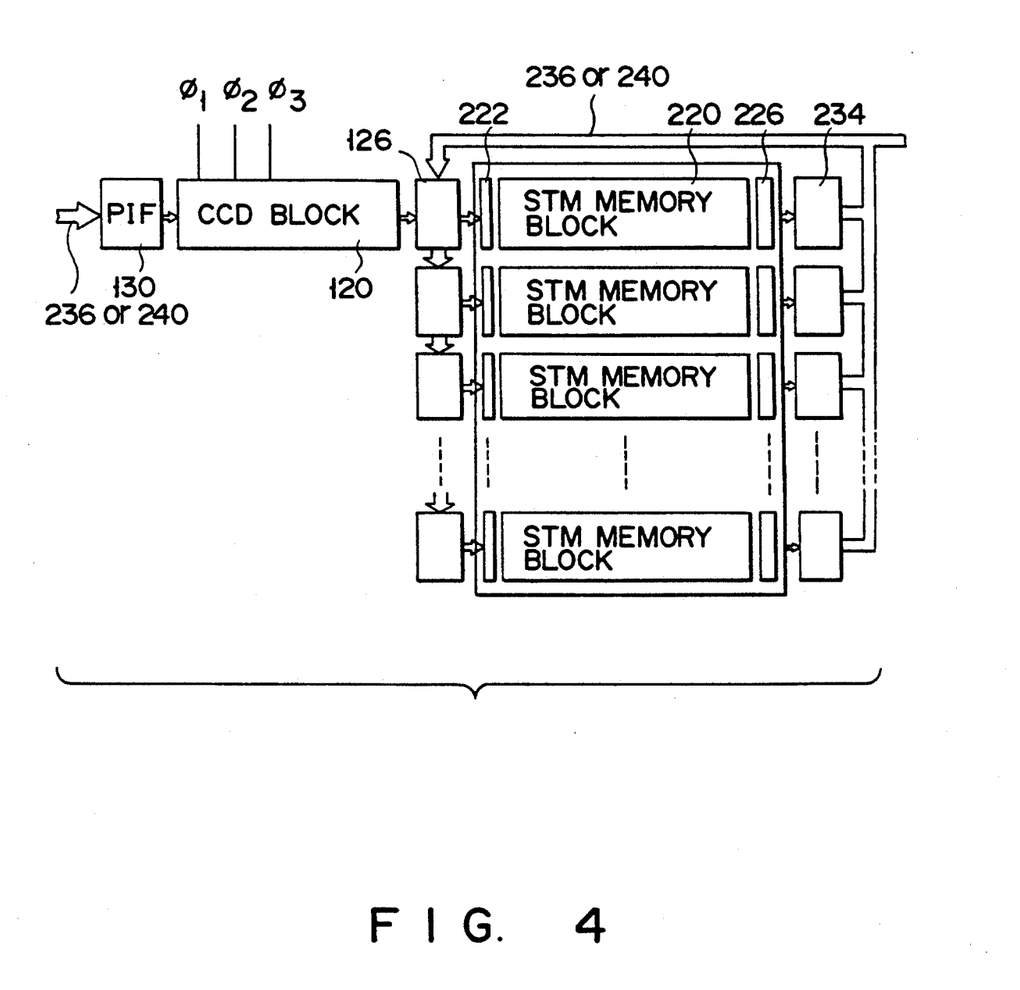
FIG. 4 shows structures of a CCD block, a plurality of STM memory blocks and the connection of their peripheral circuits.

As described above, in the scan-type tunnel current arithmetic processing apparatus of the present invention, a high-speed arithmetic operation can be carried out by combining the memory of large capacity and the signal processing circuit, such as a CCD circuit, which is suitable for signal processing for writing/reading data in/from the STM. More specifically, the high-speed data input/output can be realized by providing, on a single substrate, the CCD circuit for enabling an easy signal shift operation with use of clocks, in addition to the circuits necessary for the STM memory, i.e. the tunnel current detector, data write circuit and STM scan-synchronizing circuit, etc. Furthermore, the arithmetic processing apparatus of this invention comprises the switched-capacity circuit operated by clocks, in the rear stage of the tunnel current detector. Thus, analog-mode write and analog-mode signal processing can be performed. In the circuit system shown in FIG. 4, each of parallel interface circuits (PIFs) 126, 234, and 130 is a combination of a logic AND, a logic OR and an inverter and constitutes a gate circuit. The parallel interface circuits 126, 234 and 130 serve to determine how data is transferred between each STM memory block 220 and the CCD block 120. Operation of the circuit system shown in FIG. 4 is as follows. In the case where data is transferred from the uppermost STM memory block 220 to the second STM memory block 220, the CPU 228 shown in FIG. 3 supplies a command to PIFS 126 and 234, so as to open the gates of the two STM memories. As a result, a channel used for the data transfer between the two STM memories is formed by utilization of bus 236. To transfer data between the CCD block 120 and the uppermost STM memory block 220 (or any other memory block), PIFs 130 and 234 are supplied with a command from the CPU 228, so as to form a channel used for the data transfer.

In the STM memory, the tunnel current probe moves over the recording element at a predetermined scan speed Vs, it records data at a predetermined time interval Tp (clock frequency ft=1/Tp) and with a pulse width Td. On the other hand, the data input and data transfer for the CCD circuit are carried out by various methods such as three-phase transfer, two-phase transfer, quasi-single phase transfer and four-phase transfer. In the case where the clock frequency of the CCD circuit is set to fc and the parallel transfer, which characterizes the present invention, is performed, if one CCD circuit is made to correspond to one STM memory, serial recording can be performed in each unit of the corresponding CCD circuit and STM memory. Since both the CCD circuit and the STM memory are controlled by clocks and are operated in an analog manner, the high-speed arithmetic processing can easily be realized. In other words, in the STM memory, analog signal recording using a tunnel current can be performed in accordance with the amount of data to be written and read in the digital manner. Also, since the CCD circuit can process analog signals, high-speed analog recording can be effected on the recording element of the STM memory after analog input data is transferred out from the CCD circuit, with use of a simple interface circuit and without using an A/D converter.

If an STM recording analog reference signal source circuit is added to the apparatus, a multi-value logical circuit can be formed in the CPU.

Furthermore, since the CCD circuit can have an optical sensor function, a multi-functional one chip processor, which performs operations from image input to image arithmetic processing, can easily be obtained.

The present invention is not limited to the above embodiment. Various modifications can be made within the scope of the subject matter of the invention. For example, the tunnel current probes 112 can be formed on the second cantilever 200, and the recording element can be formed on the first cantilever 100. Also, the second substrate 12 may be arranged above and first substrate 10 may be arranged below, such that the free end portions 110 and 210 of the cantilevers 100 and 200 face each other.

What is claimed is:

1. A memory apparatus using tunnel current techniques, comprising:
    a plurality of tunnel current probes fixed to a first substrate;
    a recording element fixed to a second substrate, said recording element including a plurality of memory regions respectively facing said plurality of tunnel current probes;
    moving means for moving at least one of the first and second substrates relative to the other so that each of said plurality of tunnel probes is periodically scanned across its corresponding memory region;
    input means for providing input data to be stored in said plurality of memory regions;
    write means receiving said input data and coupled to said plurality of tunnel current probes for writing said input data into said plurality of memory regions;
    read means coupled to said plurality of tunnel current probes for reading out data written into said plurality of memory regions;
    interface means coupled to the input means and the write means for transferring data into said plurality of memory regions;
    first control means for controlling data transfer between the input means and the interface means; and
    second control means for controlling data transfer between the interface means and the write means, said second control means having a data transfer speed which is an integer multiple, other than one, of that of the first control means.

2. The apparatus of claim 1, wherein each of said plurality of memory regions comprises a plurality of recording positions, and said first and second control means, in a data writing mode, synchronize operation of the input means, moving means, and write means for transferring said input data from said input means into assigned recording positions in each of said memory regions and, in a data reading mode, synchronize operation of said moving means and said read means to read out data written into said assigned recording positions.

3. The apparatus according to claim 1, wherein said write means and said read means are arranged on one of said first and second substrates, and said moving means is arranged on each of the first and second substrates.

4. The apparatus according to claim 1, wherein said moving means comprises cantilevers formed of piezoelectric elements.

5. The apparatus according to claim 1, wherein said write means includes means for adjusting a magnitude of voltage applied across the tunnel current probes and the recording element.

6. The apparatus according to claim 1, wherein said write means includes means for adjusting, in accordance with data to be written, a voltage application time period in which a voltage is applied across the tunnel current probes and the recording element.

7. The apparatus according to claim 1, wherein said write means includes means for adjusting, in accordance with data to be written, a distance between the tunnel current probes and the recording element, across which a predetermined bias voltage is applied.

8. The apparatus according to claim 1, wherein said plurality of memory regions and corresponding tunnel current probes are arranged in a rectangular array.

9. The apparatus of claim 1, wherein said first and second control means control said moving means, said write means and said read means to perform data writing and reading, while scanning the probes across the memory regions in a first-in-first-out recording mode.

10. The apparatus of claim 1, wherein said first and second control means control said moving means, said write means and said read means to perform data writing and reading, while scanning the probes across the memory regions in a last-in-first-out mode.

11. The apparatus of claim 1, wherein each of said plurality of tunnel probes is raster scanned across its corresponding memory region.

12. The apparatus according to claim 1, wherein said input means outputs n-bits of data simultaneously, said recording element comprising a plurality of recording blocks with each recording block including n of said memory regions respectively coupled to receive said n-bits of data, and said first and second control means, in a data writing mode, sequencing through said plurality of recording blocks in synchronization with said input means, moving means and write means.

13. The apparatus according to claim 12, wherein said first and second control means control said write means and said read means to provide parallel input/output operation for said plurality of recording blocks.

14. A memory apparatus using tunnel current techniques, comprising:
a plurality of tunnel current probes fixed to a first substrate;
a recording element fixed to a second substrate, said recording element including a plurality of memory regions respectively facing said plurality of tunnel current probes;
moving means for moving at least one of the first and second substrates relative to the other so that each of said plurality of tunnel probes is periodically scanned across its corresponding memory region;
input means for providing input data to be stored in said plurality of memory regions;
write means receiving said input data and coupled to said plurality of tunnel current probes for writing said input data into said plurality of memory regions;
read means coupled to said plurality of tunnel current probes for reading out data written into said plurality of memory regions;
interface means coupled to the input means and the write means for transferring data into said plurality of memory regions;
first control means for controlling data transfer between the input means and the interface means; and
second control means for controlling data transfer between the interface means and the write means, said second control means having a data transfer speed which is an integer multiple, other than one, of that of the first control means;
wherein said write means and said read means are fixed to said first substrate.

15. The apparatus of claim 14, wherein said input means is fixed to said first substrate.

16. The apparatus of claim 14, wherein said moving means is fixed on each of said first and second substrates.

17. The apparatus of claim 14, wherein said input means comprises a charge coupled device (CCD) circuit.

18. The apparatus of claim 14, wherein each of said plurality of tunnel probes is raster scanned across its corresponding memory region.

19. The apparatus of claim 14, wherein said first control means, said second control means, and said interface means are fixed to said first substrate.

20. The apparatus of claim 14, wherein said input means is fixed to said first substrate.

21. The apparatus of claim 20, wherein said moving means is fixed on each of said first and second substrates.

* * * * *